United States Patent
Park

(10) Patent No.: US 11,998,138 B2
(45) Date of Patent: Jun. 4, 2024

(54) NEGATIVE POISSON'S RATIO MATERIALS FOR COOKWARE

(71) Applicant: Joon Bu Park, Las Vegas, NV (US)

(72) Inventor: Joon Bu Park, Las Vegas, NV (US)

(*) Notice: Subject to any disclaimer, the term of this patent is extended or adjusted under 35 U.S.C. 154(b) by 55 days.

(21) Appl. No.: 17/970,982

(22) Filed: Oct. 21, 2022

(65) Prior Publication Data

US 2024/0130562 A1    Apr. 25, 2024

(51) Int. Cl.
| | | |
|---|---|---|
| *A47J 36/02* | (2006.01) | |
| *A47J 37/01* | (2006.01) | |
| *A47J 37/10* | (2006.01) | |
| *A47J 45/06* | (2006.01) | |
| *B32B 1/00* | (2024.01) | |
| *B32B 5/18* | (2006.01) | |
| *B32B 7/022* | (2019.01) | |
| *B32B 7/027* | (2019.01) | |

(52) U.S. Cl.
CPC .......... *A47J 36/025* (2013.01); *A47J 37/01* (2013.01); *A47J 37/10* (2013.01); *A47J 45/061* (2013.01); *B32B 1/00* (2013.01); *B32B 5/18* (2013.01); *B32B 7/022* (2019.01); *B32B 7/027* (2019.01); *B32B 2264/105* (2013.01); *B32B 2264/107* (2013.01); *B32B 2307/208* (2013.01); *B32B 2307/302* (2013.01); *B32B 2307/734* (2013.01); *B32B 2439/02* (2013.01)

(58) Field of Classification Search
CPC .......... A47J 36/025; A47J 37/01; A47J 37/10; A47J 45/061; B32B 7/022; B32B 7/027; B32B 1/00
USPC ...................................................... 220/573.1
See application file for complete search history.

(56) References Cited

U.S. PATENT DOCUMENTS

| | | | | |
|---|---|---|---|---|
| 3,788,513 A | * | 1/1974 | Racz | ................ C23C 28/347 |
| | | | | 428/685 |
| 11,192,170 B2 | | 12/2021 | Henry | |
| 2002/0046659 A1 | * | 4/2002 | Smith | ................ A47J 27/002 |
| | | | | 99/422 |

(Continued)

FOREIGN PATENT DOCUMENTS

| | | | | |
|---|---|---|---|---|
| CN | 113833794 | | 12/2021 | |
| DE | 102005030310 B3 | * | 12/2006 | .......... A47G 19/127 |

(Continued)

OTHER PUBLICATIONS

Luo, Yi, Yuan, Ke, Shen, Lumin and Liu, Jiefu. "Sandwich panel with in-plane honeycombs in different Poisson's ratio under low to medium impact loads" Reviews on Advanced Materials Science, vol. 60, No. 1, 2021, pp. 145-157. https://doi.org/10.1515/rams-2021-0020 (Year: 2021).*

(Continued)

*Primary Examiner* — J. Gregory Pickett
*Assistant Examiner* — Niki M Eloshway
(74) *Attorney, Agent, or Firm* — Fish & Richardson P.C.

(57) ABSTRACT

A cooking vessel includes a base having a flat bottom and a sidewall connected to and surrounding the base, thereby defining an interior space configured for containing food. The base comprises a layered composite material that includes a first layer of the composite material has a positive Poisson's ratio (PPR) and a second layer of the composite material is disposed in contact with the first layer. The cooking vessel includes a material having a negative Poisson's ratio (NPR).

18 Claims, 9 Drawing Sheets

(56) References Cited

U.S. PATENT DOCUMENTS

2014/0319152 A1    10/2014    Suck

FOREIGN PATENT DOCUMENTS

| KR | 20220112090 A * | 8/2022 |
| KR | 102471200 B1 * | 11/2022 |
| WO | WO 2013010555 | 1/2013 |

OTHER PUBLICATIONS

3D Printing in Biomedical Engineering, 1st Ed., Singh et al. (ed.), 2020, 346 pages.

Wikipedia [online], 3D printing, available on or before Dec. 16, 2021, via Internet Archive: Wayback Machine URL <https://web.archive.org/web/20211214163238/https://en.wikipedia.org/wiki/3D_printing>, retrieved on Feb. 16, 2023, URL <https://en.wikipedia.org/wiki/3D_printing>, 44 pages.

Wikipedia [online], "Cladding (metalworking)," retrieved on or before Jan. 31, 2022, via Internet Archive: Wayback Machine URL <https://web.archive.org/web/20220131204706/http://en.wikipedia.org/wiki/Cladding_(metalworking)>, retrieved on Feb. 16, 2023, URL <https://en.wikipedia.org/wiki/Cladding_(metalworking)>, 4 pages.

Wikipedia [online], "Cookware and Bakeware," available on or before Dec. 21, 2021, via Internet Archive: Wayback Machine URL <https://web.archive.org/web/20211221141607/https://en.wikipedia.org/wiki/Cookware_and_bakeware>, retrieved on Feb. 16, 2023, URL <https://en.wikipedia.org/wiki/Cookware_and_bakeware>, 15 pages.

Wikipedia [online], "Heat shield," Dec. 26, 2021, via Internet Archive: Wayback Machine URL <https://web.archive.org/web/20211226154045/https://en.wikipedia.org/wiki/Heat_shield>, retrieved on Feb. 16, 2023, URL <https://en.wikipedia.org/wiki/Heat_shield>, 5 pages.

Wikipedia [online], "Stoneware," available on or before Dec. 31, 2021, via Internet Archive: Wayback Machine URL <https://web.archive.org/web/20211231145009/https://en.wikipedia.org/wiki/Stoneware>, retrieved Feb. 16, 2023, URL < https://en.wikipedia.org/wiki/Stoneware>, 8 pages.

International Search Report and Written Opinion in International Appln. No. PCT/US2023/035116, mailed on Dec. 21, 2023, 10 pages.

* cited by examiner

11,998,138 B2

NEGATIVE POISSON'S RATIO MATERIALS FOR COOKWARE

BACKGROUND

The present disclosure related generally to materials for cookware. Cookware is used on, e.g., on a stovetop, range cooktop, inside of an oven, or elsewhere to prepare food or beverage.

SUMMARY

We describe here cookware that includes materials that exhibit a negative Poisson's ratio ("NPR cookware"). NPR cookware absorbs energy efficiently, thereby exhibiting greater tensile strength, flexibility, impact resistance, and durability than a comparable item of cookware including only material with a positive Poisson's ratio ("PPR cookware"). Furthermore, an item of cookware including NPR material can absorb, retain, and transfer thermal energy from a heating apparatus or source more effectively than otherwise a comparable item of PPR cookware, while also being lighter in weight (e.g., less dense) than the PPR cookware item. Moreover, NPR materials can have lower coefficients of thermal expansion than comparable PPR materials, and thus an item of NPR cookware can undergo less thermal shrinkage or expansion than a comparable item of PPR cookware.

In an aspect, the cooking vessel includes a base having a flat bottom and a sidewall connected to and surrounding the base, thereby defining an interior space configured for containing food. The base of the cooking vessel includes a layered composite material that includes a first layer of the composite material has a positive Poisson's ratio (PPR) and a second layer of the composite material is disposed in contact with the first layer and includes a material having a negative Poisson's ratio (NPR).

Embodiments of the cooking vessel can include one or any combination of two or more of the following features.

The first layer of the composite material and the second layer of the composite material are disposed parallel to the flat bottom of the base. The composite material includes a third layer that includes a PPR material, in which the second layer including the NPR material is disposed between the first layer and the third layer of the composite material. The second layer of the composite material includes a matrix composite including a matrix of PPR material with inclusions of NPR material.

The second layer of the composite material includes an NPR foam. The second layer of the composite material includes a re-entrant foam structure. In some embodiments, the NPR foam has a characteristic dimension of between 0.1 μm and 3 mm. The second layer of the composite material includes a metal or ceramic having a negative Poisson's ratio.

The cooking vessel includes a handle attached to the sidewall. In some embodiments, the cooking vessel includes a rivet attaching the handle to the sidewall. The rivet includes an NPR material. The handle of the cooking vessel includes an NPR material. In some embodiments, the handle and the sidewall of the cooking vessel are formed from a single piece of the composite material. The base and the sidewall are formed from a single piece of the composite material.

The composite material of the cooking vessel includes a ferromagnetic material. The first layer of the composite material includes the ferromagnetic material. In some embodiments, the composite material includes a thermally conductive material.

The first layer of the composite of the cooking vessel has a coefficient of thermal conductivity that is greater than a coefficient of thermal conductivity of the second layer of the composite. In some embodiments, the cooking vessel exhibits a zero Poisson's ratio.

Other implementations are within the scope of the claims.

DETAILED DESCRIPTION

We describe here cookware that includes materials that exhibit a negative Poisson's ratio ("NPR cookware"). NPR cookware absorbs energy efficiently, thereby exhibiting greater tensile strength, flexibility, impact resistance, and durability than a comparable item of cookware including only material with a positive Poisson's ratio ("PPR cookware"). Additionally, NPR cookware can be lighter in weight (e.g., less dense) than comparable PPR cookware, while still exhibiting good or even better heat transfer characteristics.

Figure 1A:
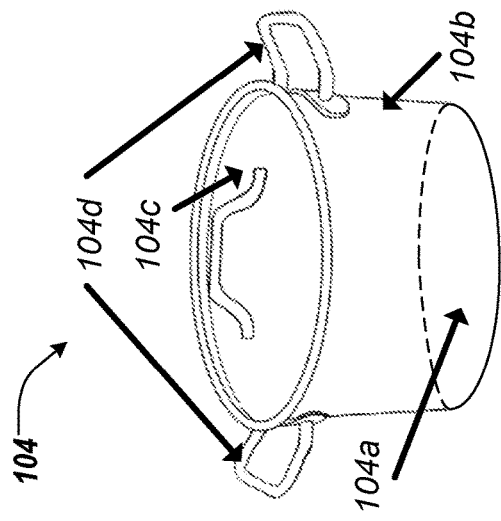
FIGS. 1A and 1B are perspective and bottom views, respectively, of NPR cookware.
Figure 1A:
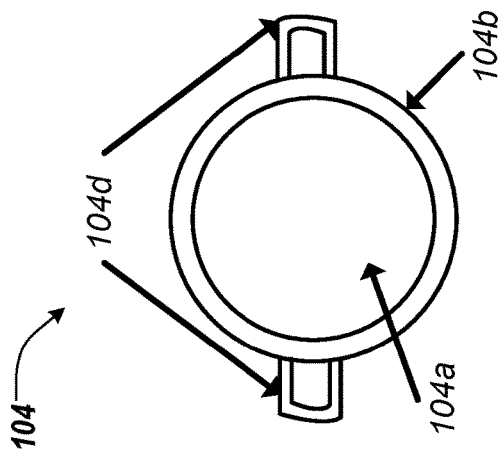
Figure 1A:
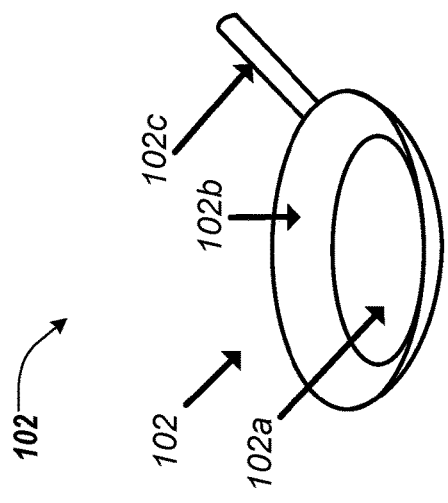
Figure 1B:
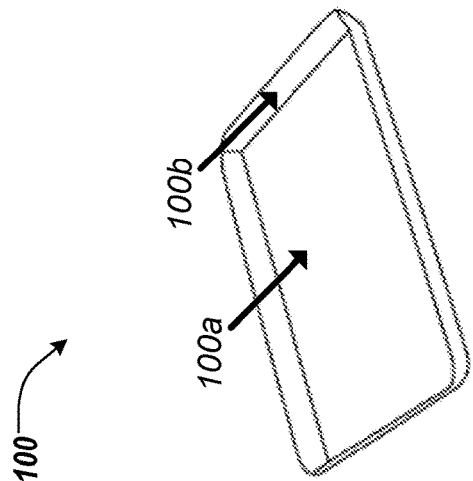
Figure 1B:
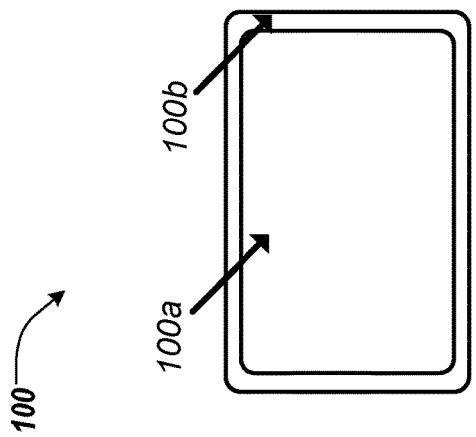

FIG. 1A and FIG. 1B illustrate examples of NPR cookware (sometimes referred to as NPR cooking vessels), including a baking sheet 100, a frying pan 102, and a pot 104, which are formed at least in part from NPR material. Although some examples of cookware are presented, other types of cookware, e.g., wok, sauté pan, sauce pan, roasting pan, stock pot, and muffin tin, can be formed at least in part from NPR material.

An item of cookware includes a base (e.g., a flat or rounded base) and sidewall(s) that together define an interior space, e.g., for the item of cookware to contain food or beverage. The base of the item of cookware includes a top surface (e.g., a cooking surface) to contain food or beverage and a bottom surface (e.g., a heating surface) to receive heat from a heating apparatus. The base and/or sidewall of the item of cookware includes an NPR material to facilitate heat transfer and to provide desired mechanical properties, such as strength, flexibility, impact resistance, and durability. For instance, the base, sidewall, or both are formed of composite materials, such as layered or matrix composites, including both NPR material and PPR material. The base and sidewall are connected, e.g., are two separate pieces of material that are attached, or are a single integral piece of material.

In some examples, the base of the item of cookware is a direct or indirect point of contact between the item of cookware and a heat source (e.g., stovetop burner, oven rack, grill, or other heating apparatus), such as a conductive or convective heat source. Cookware for conductive or convective cooking includes a thermally conductive material (e.g., copper, stainless steel, aluminum, cast iron, ceramic, or other suitable material), e.g., a thermally conductive NPR material, capable of conducting heat from the heat source to heat the food or beverage contained in the item of cookware.

In some examples, the base of the item of cookware is compatible with an induction cooktop, which is a heating apparatus that applies a changing magnetic field that induces an electrical current in the item of cookware, which thereby generates heat through resistive heating. Cookware for induction cooking includes an induction-heating compatible material, such as a ferromagnetic material. For instance, cookware for induction cooking can include cast iron, stainless steel, or another suitable material. In some examples, the induction-compatible material is also an NPR material. In some examples, the induction-compatible material is a PPR material, and the cookware also includes an NPR material, e.g., for heat transfer.

Referring specifically to the cookware illustrated in FIGS. 1A and 1B, the baking sheet 100 has a rectangular base 100a and a sidewall 100b that surrounds all sides of the rectangular base 100a. In some examples, the sidewall 100b encloses some, but not all sides of the rectangular base 100a (e.g., a cookie sheet, rimless baking sheet). The interior space enclosed by the sidewall 100b of the baking sheet 100 is shallow relative to the rectangular base 100a, e.g., the sidewall 100b is a rim of the baking sheet 100. In some examples, the interior space enclosed by the sidewall 100b is deeper than that of the illustrated baking sheet 100 (e.g., for a baking pan, muffin tin, loaf pan, etc.). In some examples, the base of the baking sheet 100 can be a rounded shape (e.g., rounded baking pan). In some examples, the base, sidewall, or both of the item of cookware have one or more openings defined through the thickness of the respective base, sidewall, or both of the item of cookware (e.g., steamer basket, colander).

The sidewall 100b slopes upward at an angle perpendicular (e.g., substantially perpendicular, such as within about 15° of perpendicular) to the rectangular base 100a. In some examples, the angle between the slope of the sidewall 100b and the rectangular base 100a of the baking sheet 100 is obtuse (e.g., more than 90 degrees). In some examples, the edge at which the rectangular base 100a intersects with the sidewall 100b is rounded. Some typical examples of the rectangular base 100a of the baking sheet 100 are approximately 9" wide×13" long (e.g., quarter sheet), 18" wide×13" long (e.g., half sheet), or 26" wide×13" long (e.g., full sheet), in size but can vary in any or all dimensions.

The frying pan 102 has a rounded base 102a, a sidewall 102b, and a handle 102c. The sidewall 102b surrounds the rounded base 102a to create an interior space for cooking. The handle 102c attached to the outer surface of the sidewall 102b. In some examples, the handle 102c is formed integrally with the sidewall 102b. Examples constructions of handle and sidewall attachments are further described in FIG. 3 below.

The interior space enclosed by the sidewall 102b of the frying pan 102 is shallow relative to the round base 102a, e.g., the sidewall 102b is a rim of the frying pan 102. In some examples, the interior space enclosed by the sidewall 100b is deeper compared to the illustrated baking sheet 100 (e.g., baking pan, muffin tin, loaf pan). In some examples where the interior space enclosed by the sidewall 100 is deeper than illustrated in FIGS. 1A and 1B, the base of the baking sheet 100 can also be a rounded shape (e.g., rounded baking pan) or can include multiple bases sharing a sidewall (e.g., muffin tin).

As illustrated in FIG. 1A, the angle between the slope of the sidewall 102b and the rounded base 102a is obtuse (e.g., more than 90 degrees). In some examples, the sidewall 102b slopes upward at an angle perpendicular to the rounded base 102a (e.g., sauté pan). Some typical examples of the rounded base 102a of the frying pan 102 are approximately 8", 10", or 12" in diameter but can vary.

In some examples, the frying pan 102 has a corresponding lid (not illustrated) to cover the interior space and maintain a desired temperature by retaining heat.

The pot 104 has a rounded base 104a, a sidewall 104b, a lid 104c, and a pair of handles 104d. The sidewall 104b surrounds the rounded base 104a to create an interior space for cooking. The pair of handles 104 are attached to or formed integrally with the sidewall 104b. The interior space enclosed by the sidewall 104b of the pot 104 is deep relative to the round base 104a.

The sidewall 104b slopes upward at an angle perpendicular to the rounded base 104a but in some examples (e.g., Dutch oven), the angle between the slope of the sidewall 104b and the rounded base 104a is obtuse (e.g., more than 90 degrees). Some typical examples of the rounded base 104 of the pot 104 are approximately 10–12" in diameter but can vary.

In some examples, an item of cookware includes a lid (e.g., lid 104c of pot 104) to cover the interior space and maintain a desired temperature by retaining heat.

The base of an item of cookware (e.g., rectangular base 100a, rounded base 102a, rounded base 104a) is a composite structure, e.g., a layered composite that includes layers of a negative Poisson's ratio (NPR) material and layers of a positive Poisson's ratio (PPR) material, or a matrix composite that includes a matrix of one type of material with inclusions of the other type of material (e.g., a matrix of PPR material with inclusions of NPR material, or a matrix of NPR material with inclusions of PPR material). Examples of multi-layer composite structures used in items of cookware are further described with reference to FIG. 2 below.

An NPR material is a material that has a Poisson's ratio that is less than zero, such that when the material experiences a positive strain along one axis (e.g., when the material is stretched), the strain in the material along the two perpendicular axes is also positive (e.g., the material expands in cross-section). Conversely, when the material experiences a negative strain along one axis (e.g., when the material is compressed), the strain in the material along a perpendicular axis is also negative (e.g., the material compresses along the perpendicular axis). By contrast, a material with a positive Poisson's ratio (a "PPR material") has a Poisson's ratio that is greater than zero. When a PPR material experiences a positive strain along one axis (e.g., when the material is stretched), the strain in the material along the two perpendicular axes is negative (e.g., the material compresses in cross-section), and vice versa The presence of NPR material in cookware can contribute to target performance characteristics, such as energy absorption (e.g., mechanical, electrical, magnetic, or thermal energy), tensile strength, flexibility, impact resistance, durability, low density, high porosity, etc. For example, an item of cookware including NPR material can absorb energy from impacts or applied forces, e.g., moderate or excessive usage in restaurants kitchens, for instance, absorbing compressive forces both vertically and laterally. An item of cookware including NPR material is more durable and less like to chip or fracture than otherwise a comparable item of cookware. Furthermore, an item of cookware including NPR material can absorb, retain, and transfer thermal energy from a heating apparatus or source more effectively than otherwise a comparable item of PPR cookware. Additionally, NPR materials have a lower density than PPR materials, e.g., than PPR materials of a similar composition or than PPR materials having similar mechanical properties, and an item of NPR cookware can thus be lighter in weight than otherwise a comparable item of PPR cookware.

NPR materials can have lower coefficients of thermal expansion than comparable PPR materials, and thus an item of NPR cookware can undergo less thermal shrinkage or expansion than a comparable item of PPR cookware. In some examples, the composition and/or proportion of NPR and PPR materials in an item of NPR cookware is selected such that the item of NPR cookware has an overall coefficient of thermal expansion that is near zero, e.g., between −0.1 and 0.1, such that the item of NPR cookware substantially does not change in size or shape with exposure to thermal variations.

In some examples, the composition and/or proportion of NPR and PPR materials in an item of NPR cookware is selected such that the item of NPR cookware as a whole has Poisson's ratio of close to zero (referred to as "zero Poisson's ratio behavior" or "ZPR behavior"), e.g., a Poisson's ratio of between about −0.1 and about 0.1. For instance, the NPR and PPR materials can be selected such that responsive to an applied compressive force, the NPR materials contract laterally by substantially the same amount as the amount by which the PPR materials expand.

NPR materials can include NPR foam materials, such as an NPR ceramic foam, an NPR polymer foam, or an NPR metal foam. NPR ceramic foams include foams of clay, sand, lime, or other suitable ceramics. NPR polymer foams include NPR thermoplastic polymer foams (e.g., polyester polyurethane or polyether polyurethane) or NPR viscoelastic elastomer foams. NPR metal foam include foams of metals such as steel, stainless steel, titanium, aluminum, brass, or other metals, or alloys thereof. A foam is a multi-phase composite material in which one phase is gaseous and the one or more other phases are solid (e.g., polymeric, ceramic, or metal). Foams can be closed-cell foams, in which each gaseous cell is sealed by solid material; open-cell foams, in which the each cell communicates with the outside atmosphere; or mixed, in which some cells are closed and some cells are open.

In some examples, some or all of the components of an item of NPR cookware are formed of an NPR-PPR composite material that includes both an NPR material (e.g., an NPR foam material) and a PPR material. NPR-PPR composite materials are discussed further below. In some examples, an inner portion (e.g., a core) of a base of an item of NPR cookware includes an NPR material (e.g., is formed of an NPR material or an NPR-PPR composite material), and a PPR material covers the inner portion such that the NPR material of the core is not exposed to the environment. This configuration can provide some of the benefits of an NPR material while also achieving benefits, such as durability, water resistance, or hardness, provided by the PPR material covering. In some examples, an inner layer or core of a base of an item of cookware (e.g., rectangular base 100a, rounded base 102a, and rounded base 104a) is a PPR material and the covering includes an NPR material (e.g., is formed of an NPR material or an NPR-PPR composite material).

An example of an NPR foam structure is a re-entrant structure, which is a foam in which the walls of the cells are concave, e.g., protruding inwards toward the interior of the cells. In a re-entrant foam, compression applied to opposing walls of a cell will cause the four other, inwardly directed walls of the cell to buckle inward further, causing the material in cross-section to compress, such that a compression occurs in all directions. Similarly, tension applied to opposing walls of a cell will cause the four inwardly directed walls of the cell to unfold, causing the material in cross-section to expand, such that expansion occurs in all directions. NPR foams can have a Poisson's ratio of between −0.5 and 0, e.g., −0.5, −0.4, −0.3, −0.2, or −0.1. NPR foams can have an isotropic Poisson's ratio (e.g., Poisson's ratio is the same in all directions) or an anisotropic Poisson's ratio (e.g., Poisson's ratio when the foam is strained in one direction differs from Poisson's ratio when the foam is strained in a different direction).

Figure 2A:
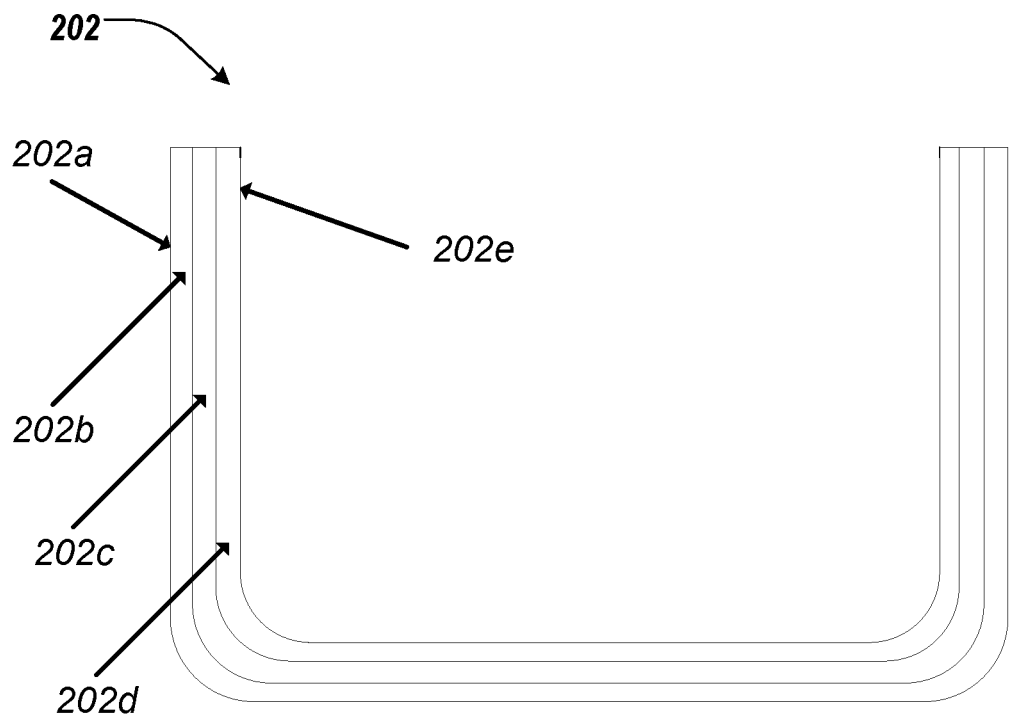
FIGS. 2A and 2B are cross sectional views of NPR cookware.
Figure 2B:
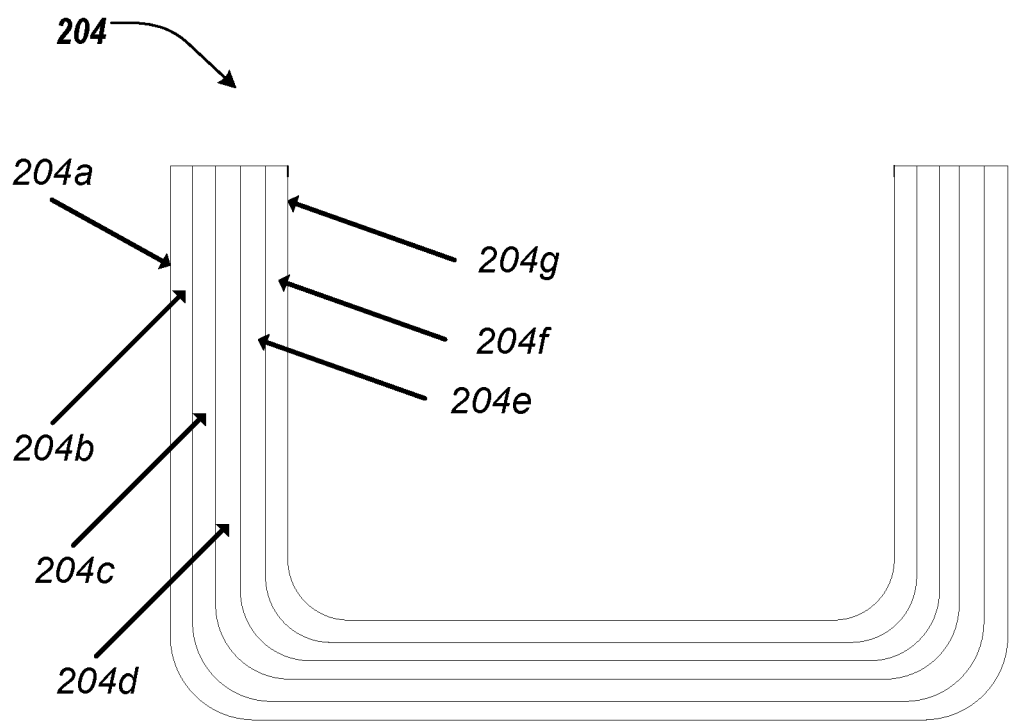

In some examples, the base (e.g., rectangular base 100a, rounded base 102a, and rounded base 104a) and the sidewall (e.g., sidewall 100b, sidewall 102b, and sidewall 104b) of an item of cookware is a composite of NPR material and PPR material, e.g., a layered composite with alternating layers of NPR and PPR material or a matrix composite (e.g., NPR inclusions in a PPR matrix, or PPR inclusions in an NPR matrix). In some examples, one or more of the layers of a layered composite is itself a composite, such as a matrix composite. FIGS. 2A and 2B show cross sections of example cookware with an NPR-PPR layered composite structure.

In some examples, the PPR layer provides the cooking functionality and the NPR layer provides low density and structural integrity. For instance, for induction cookware, the PPR layers can contain a ferromagnetic material while the NPR layers contain no ferromagnetic material. For conventional cookware, the PPR layers can have a coefficient of thermal conductivity that is greater than that of the NPR layers.

FIG. 2A illustrates a cross section of an item of cookware 202 with a base and a sidewall formed of an NPR-PPR layered composite material including layers 202b-202d, with the outermost layer 202b defining a bottom surface 202a and the innermost layer 202d defining a top surface 202e. The composite material includes alternating parallel layers of NPR material and PPR material. In an example, layer 202b and 202d each includes a PPR heat transfer material (e.g., a thermally conductive or ferromagnetic material), and the inner layer 202c includes an NPR material, such that the NPR material is not exposed to the exterior environment. In some examples, the layer 202c includes only NPR material. In some examples, the layer 202c is a matrix composite material composed of inclusions of NPR material in a PPR matrix, or inclusions of PPR material in an NPR matrix. In some examples, the layer 202c is itself a layered NPR-PPR composite material, with the orientation of the layers being at a non-zero angle from the orientation of the layers 202a-202c, such as a 45° angle or a 90° angle.

FIG. 2B illustrates a cross section of an item of cookware 204 with a base and a sidewall formed of an NPR-PPR layered composite material including layers 204b-204f, with the outermost layer 204b defining a bottom surface 204a and the innermost layer 204f defining a top surface 204g. The composite material includes alternating parallel layers of NPR material and PPR material. For instance, layers 204b, 204d, and 204f each includes a PPR heat transfer material (e.g., a thermally conductive or ferromagnetic material), and the other layers 204c, 204e include an NPR material, such that the NPR material is not exposed to the exterior environment. As with the layered composite of FIG. 2A, the layers 204c, 204e each can include only an NPR material or can be a matrix or layered NPR-PPR composite material.

In a specific example, the layers of the NPR-PPR composite are all of the same composition, but the microstructure of the layers differs to provide the NPR or PPR behavior of each layer. In some examples, both the composition and the microstructure varies between layers. Generally, both the NPR material and the PPR material of an NPR-PPR layered or matrix composite are materials that have high thermal conductivity and mechanical robustness, e.g., stainless steel, coper, aluminum, cast iron, ceramic, etc.

The use of NPR material for an item of cookware as a layer disposed between PPR heat transfer material can have numerous advantages. One advantage of NPR material includes efficient thermal distribution and retention throughout the item of cookware, resulting in improved cook times of foodstuff compared to a cookware including PPR material, while being lighter weight, enabling easier handling of the item of cookware. An additional advantage of NPR material in cookware is the improved durability (e.g., resistance to fracturing, chipping, or shattering) compared to PPR material in cookware.

In some examples, a coating (e.g., ceramic, polytetrafluoroethylene, carbon steel, silica, anodized aluminum) is disposed on the surface of an item of cookware (e.g., the top surface 202e of the item of cookware 202 of FIG. 2A) to reduce friction (e.g., providing a non-stick characteristic) between foodstuff and the surface.

In some examples, only the base of the item of cookware is a composite, and the sidewalls include only a PPR heat transfer material (e.g., a thermally conductive or ferromagnetic material). In some examples, the layers of the composite include more than one thermally conductive material, e.g., stainless steel with an aluminum plating. In some examples, one or more of the layers includes a magnetically conductive (e.g., ferromagnetic) material (e.g., stainless steel, cast iron) to allow the induction of an electric current for induction cooking.

Although a number of layers are illustrated in FIGS. 2A-2B, an item cookware can have a structure formed of any suitable number of layers and arrangements, e.g., between 3 and 100 layers. In some examples, such as when the number of layers is small, e.g., less than 10, the layers of the composite structure can be laminated together to form the item of cookware. In some examples, such as when the number of layers is large, a composite NPR-PPR material can be formed and subsequently formed, e.g., by machining or molding, into the shape of the item of cookware.

NPR-PPR composite materials are composites that include both regions of NPR material and regions of PPR material. NPR-PPR composite materials can be laminar composites, matrix composites (e.g., metal matrix composites, polymer matrix composites, or ceramic matrix composites), particulate reinforced composites, fiber reinforced composites, or other types of composite materials. In some examples, the NPR material is the matrix phase of the composite and the PPR material is the reinforcement phase, e.g., the particulate phase or fiber phase. In some examples, the PPR material is the matrix phase of the composite and the NPR material is the reinforcement phase.

Figure 3A:
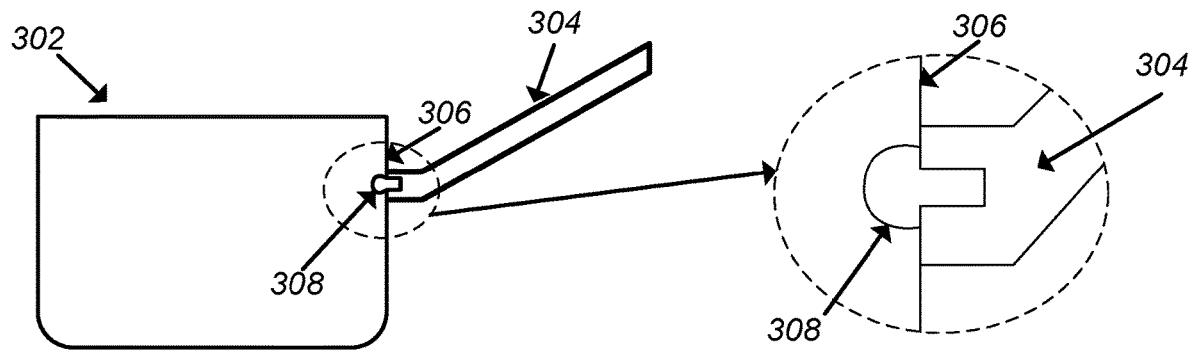
FIGS. 3A-3C are side views of NPR cookware.
Figure 3B:
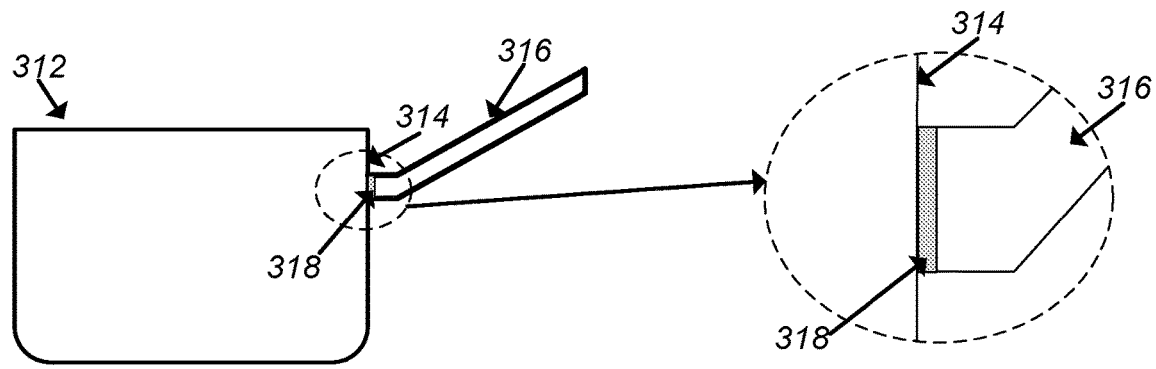
Figure 3C:
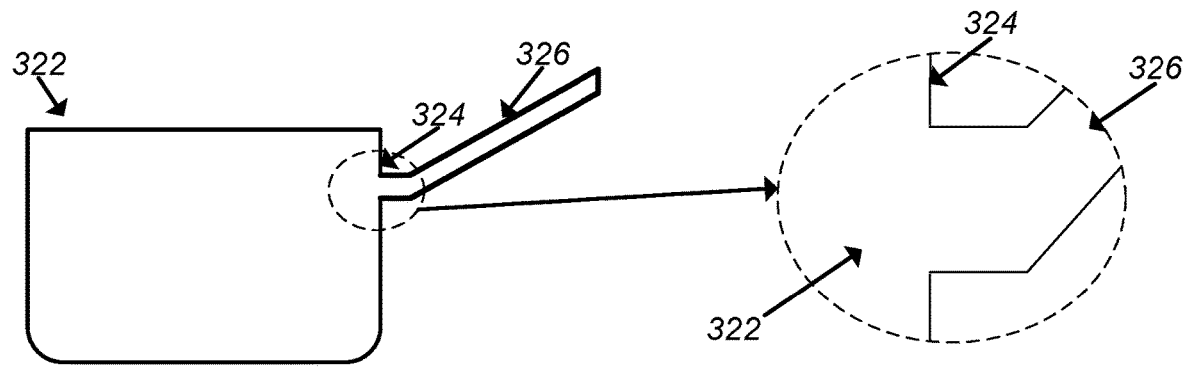

FIGS. 3A-3C illustrate NPR cookware 302, 312, and 322 with corresponding configurations (e.g., attachments, arrangements) between an example item of NPR cookware e.g., frying pan 102 or pot 104 (referring to FIG. 1A) and an example handle e.g., handle 102c of frying pan 102 or a pair of handles 104d of pot 104 (referring to FIG. 1A).

Referring to FIGS. 3A-3C, items of NPR cookware 302, 312, 322 each has a handle 304, 316, 326, respectively. In some examples, the handle 304, 316, 326 itself can include a NPR material, e.g., can be an NPR-PPR layered or matrix composite. Advantages of an NPR handle can include that the NPR handle is greater durability compared to abut higher thermal resistance e.g., less risk of fractures or damage to the handle.

FIG. 3A illustrates an item of NPR cookware 302 with a handle 304 attached to a surface of a sidewall 306 by one or more rivets 308. The rivet 308 is a mechanical fastener that includes a cylindrical stem with a rounded head, where the cylindrical stem extends through an opening in the sidewall 306. The rivet 308 mechanically fastens the handle 304 to the sidewall 306.

In some examples, the rivets 308 include NPR material (e.g., an "NPR rivet"), which can provide mechanical advantages. For instance, to insert the NPR rivet 308 into the sidewall 306, a force is applied, which compresses the NPR rivet along the axis of its stem. Because of the presence of an NPR material, this applied force causes the NPR rivet to compress in all directions during insertion into the sidewall. After insertion, the NPR rivet relaxes and expands in all directions, providing a snug fit in the opening in the sidewall. Moreover, any tension applied to the NPR rivet once installed will cause the NPR rivet to expand in all directions, increasing the snugness of the fit and thus the security of the attachment of the handle to the sidewall. In some examples, the NPR rivet includes ridges or other texture along the exterior of the stem to provide additional gripping strength between the rivet and the sidewall of the item of cookware.

FIG. 3B illustrates an item of NPR cookware 312 with a handle 316 attached to a surface of a sidewall 314 by a weld 318. The weld 318 is a welded joint between the handle 316 and the sidewall 314 created by applying a high heat from a heating apparatus (e.g., blowtorch, electric arc) to the surface of the handle and the sidewall. The high heat melts the respective surfaces, which then can be united by pressing, hammering, or allowing them to cool (e.g., fusing metals). In some examples, a similar configuration (e.g., soldering, brazing) to using a weld 318 include the use of an additional binder material (e.g., copper and zinc alloy, silver, brass, bronze) between the two components. In some examples, the weld 318 is created by applying high pressure (e.g., solid-state welding) instead of, or in addition to high heat, between the two components. An NPR handle welded to the sidewall of an item of NPR cookware enables a firm attachment without transferring too much heat to the NPR handle 316, compared to a comparable handle formed of PPR material (e.g., a "PPR handle.)

FIG. 3C illustrates an item of NPR cookware 322 with a handle 326 and a sidewall 324 formed from a single piece of NPR-PPR composite material, e.g., by molding, extrusion, compression, injection, or other approaches. One advantage an item of NPR cookware 322 formed of a single piece of composite material is a simplified manufacturing process and reduced costs compared to cookware fabricated by other methods (e.g., fusing or attaching two or more separate components).

Figure 4:
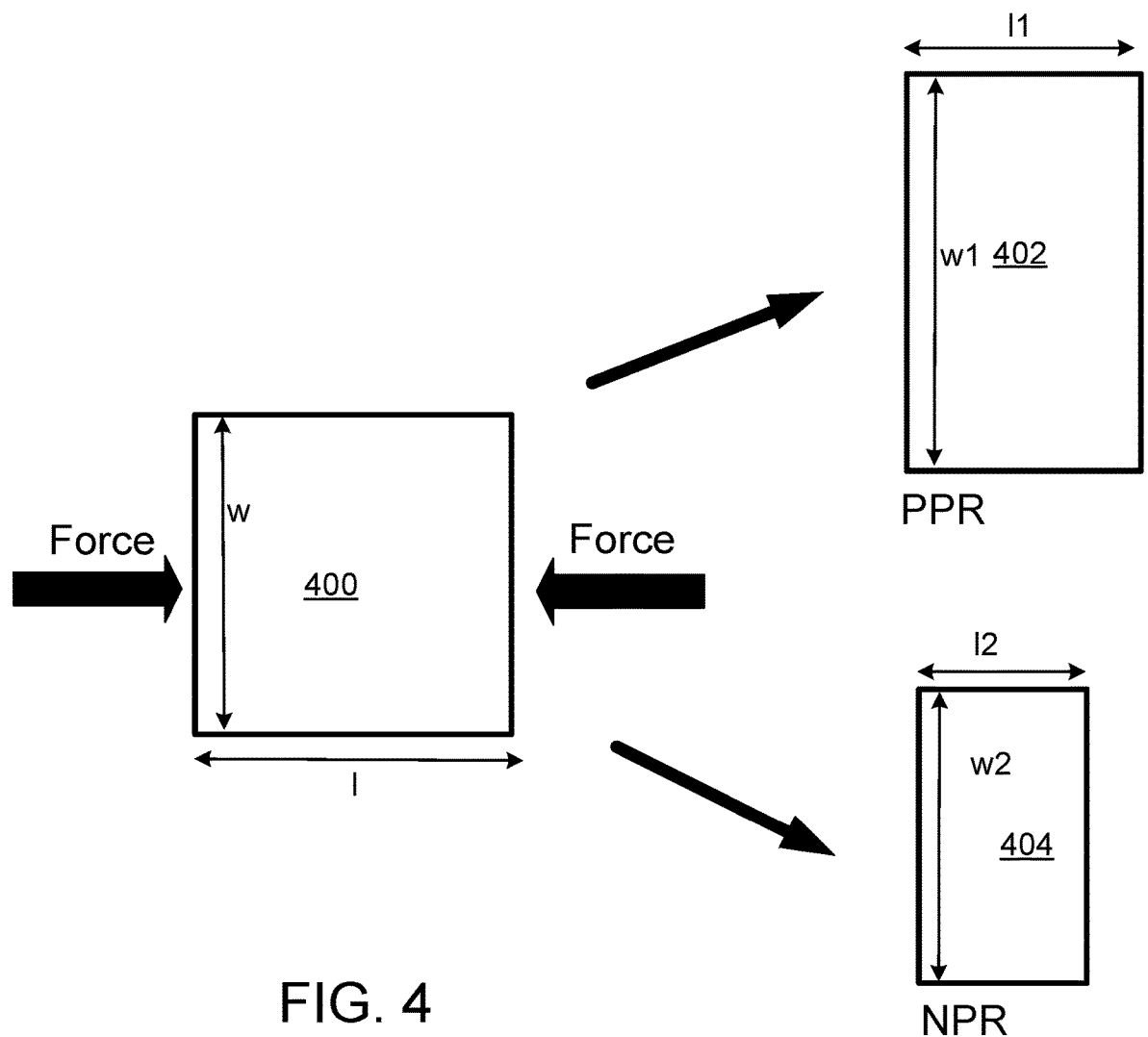
FIG. 4 is an illustration of materials with negative and positive Poisson's ratios.

More materials with negative and positive Poisson's ratios are illustrated in FIG. 4, which depicts a hypothetical two-dimensional block of material 400 with length l and width w.

If the hypothetical block of material 400 is a PPR material, when the block of material 400 is compressed along its width w, the material deforms into the shape shown as block 402. The width w1 of block 402 is less than the width w of block 400, and the length l1 of block 402 is greater than the length 1 of block 400: the material compresses along its width and expands along its length.

By contrast, if the hypothetical block of material 400 is an NPR material, when the block of material 400 is compressed along its width w, the material deforms into the shape shown as block 404. Both the width w2 and the length l2 of block 404 are less than the width w and length 1, respectively, of block 400: the material compresses along both its width and its length.

NPR materials for cookware can be foams, such as polymeric foams, ceramic foams, metal foams, or combinations thereof. A foam is a multi-phase composite material in which one phase is gaseous and the one or more other phases are solid (e.g., polymeric, ceramic, or metal). Foams can be closed-cell foams, in which each gaseous cell is sealed by solid material; open-cell foams, in which the each cell communicates with the outside atmosphere; or mixed, in which some cells are closed and some cells are open.

An NPR foam can be polydisperse (e.g., the cells of the foam are not all of the same size) and disordered (e.g., the cells of the foam are randomly arranged, as opposed to being arranged in a regular lattice). An NPR foam can be a cellular structure having a characteristic dimension (e.g., the size of a representative cell, such as the width of the cell from one wall to the opposing wall) ranging from 0.1 µm to about 3 mm, e.g., about 0.1 µm, about 0.5 µm, about 1 µm, about 10 µm, about 50 µm, about 100 µm, about 500 µm, about 1 mm, about 2 mm, or about 3 mm.

In some examples, NPR foams are produced by transformation of PPR foams to change the structure of the foam into a structure that exhibits a negative Poisson's ratio. In some examples, NPR foams are produced by transformation of nanostructured or microstructured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layers of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

In some examples, NPR foams are produced by transformation of PPR foams to change the structure of the foam into a structure that exhibits a negative Poisson's ratio. In some examples, NPR foams are produced by transformation of nanostructured or microstructured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layers of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

NPR-PPR composite materials are composites that include both regions of NPR material and regions of PPR material. NPR-PPR composite materials can be laminar composites, matrix composites (e.g., metal matrix composites, polymer matrix composites, or ceramic matrix composites), particulate reinforced composites, fiber reinforced composites, or other types of composite materials. In some examples, the NPR material is the matrix phase of the composite and the PPR material is the reinforcement phase, e.g., the particulate phase or fiber phase. In some examples, the PPR material is the matrix phase of the composite and the NPR material is the reinforcement phase.

NPR materials can exhibit various desirable properties, including high shear modulus, effective energy absorption, and high toughness (e.g., high resistance to indentation, high fracture toughness), among others. The properties of NPR materials are such that an item of cookware that includes an NPR material (an item of "NPR cookware") undergoes a different (e.g., smaller) change in dimension when absorbing energy than a comparable item of cookware formed of only PPR material (an item of "PPR cookware", respectively).

The compressibility of an item of cookware affects the elastic deformation (e.g., compression) experienced by the item of cookware when it absorbs energy from impacts. A suitable amount of deformation enables core of the item of cookware to expand and compress to maintain the integrity of the item of cookware. A highly deformable item of cookware will have a large amount deformation when absorbing impact and may be inefficient in supporting compressive loads (e.g., supporting prolonged use, large quantities of foodstuff). To design an item of cookware that is capable of efficiently absorbing impact, the material of the item of cookware can be selected to balance rigidity and elasticity. NPR materials can be incorporated into the item of cookware to provide a desired deformability (e.g., rigidity) and strength.

Figure 5:
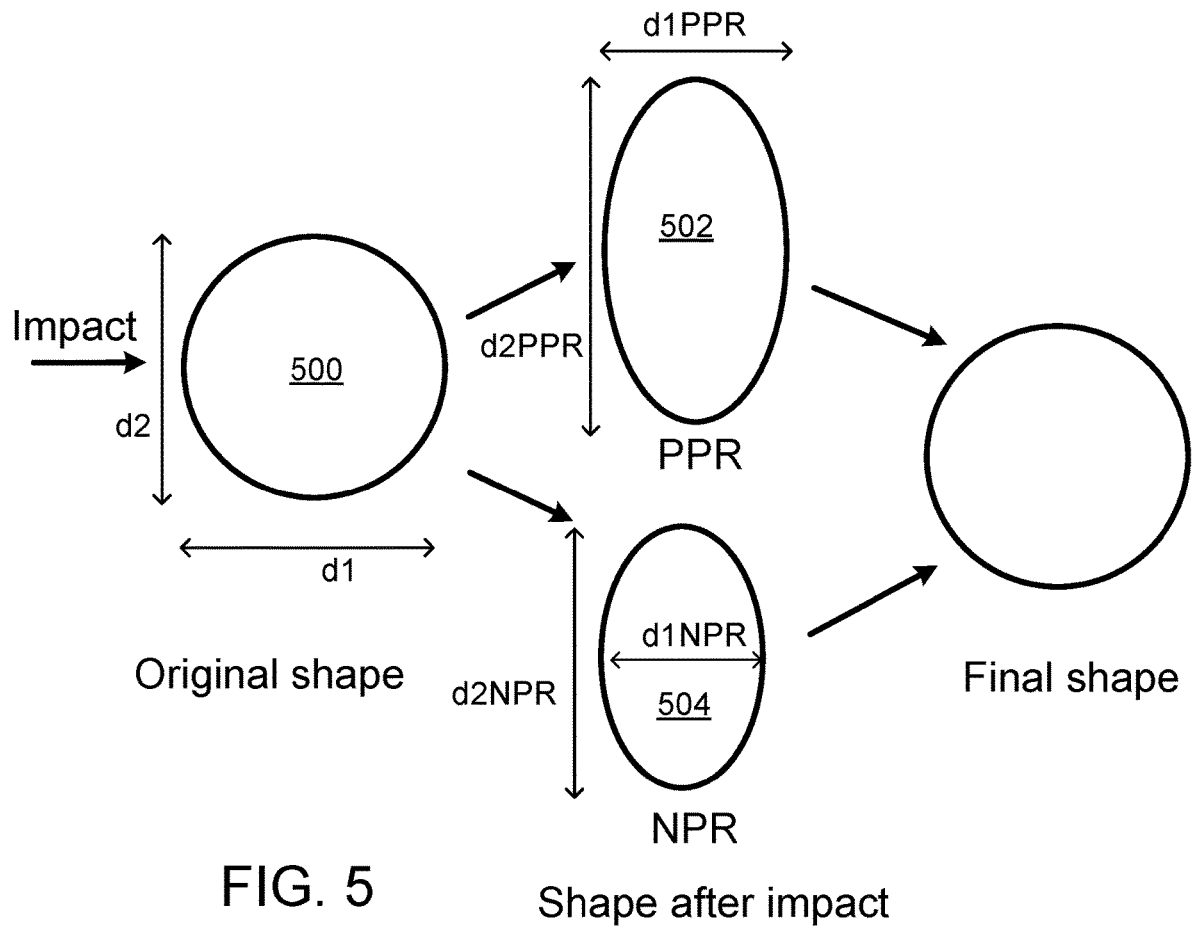
FIG. 5 is an illustration of balls with negative and positive Poisson's ratios.

FIG. 5 shows a schematic depiction of the change in diameter of a material 500 upon impact. Although the material 500 in FIG. 5 is shown as a rounded ball, a similar deformation occurs in materials of other shapes. Prior to impact, the material 500 has a diameter d1 in the direction of the impact and a diameter d2 in the direction perpendicular to the impact. If the material 500 is a PPR material, the material undergoes significant deformation (e.g., elastic deformation) into a shape 502, such that the diameter in the direction of the impact decreases to d1PPR and the diameter in the direction perpendicular to the impact increases to d2PPR. By contrast, if the material 500 is an NPR material, the material undergoes less extensive deformation into a shape 504. The diameter of the shape 504 in the direction of the impact decreases to d1NPR, which is approximately the same as d1PPR. However, the diameter of the shape 504 in the direction perpendicular to the impact also decrease, to d2NPR. The magnitude of the difference between d2 and d2NPR is less than the magnitude of the difference between d2 and d2PPR, meaning that the NPR material undergoes less deformation than the PPR ball.

Figure 6A:
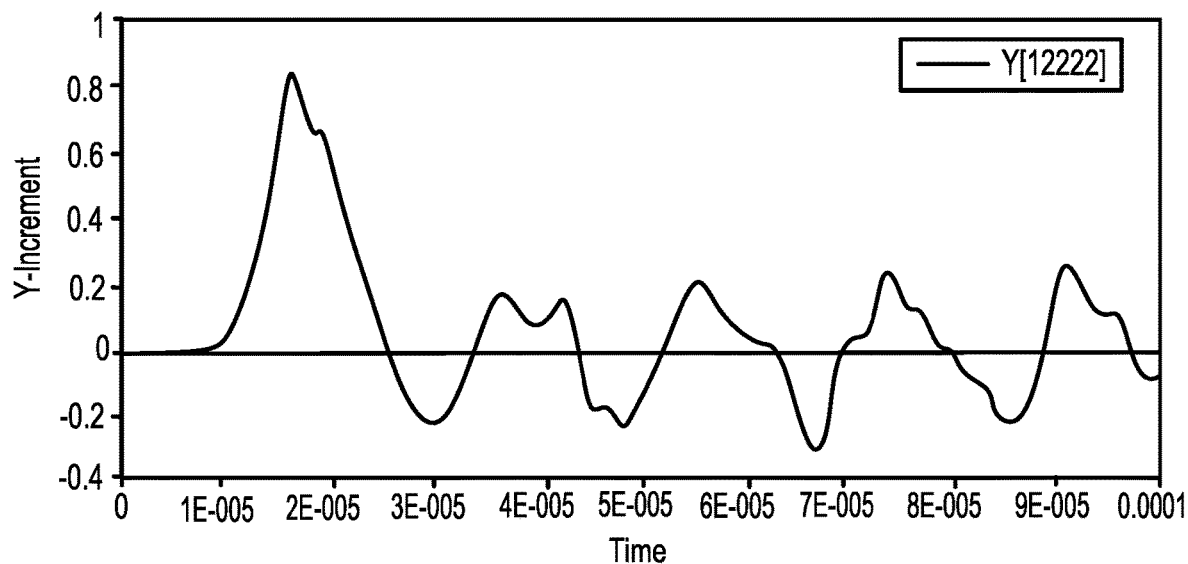
FIGS. 6A and 6B are plots of diameter versus time.
Figure 6B:
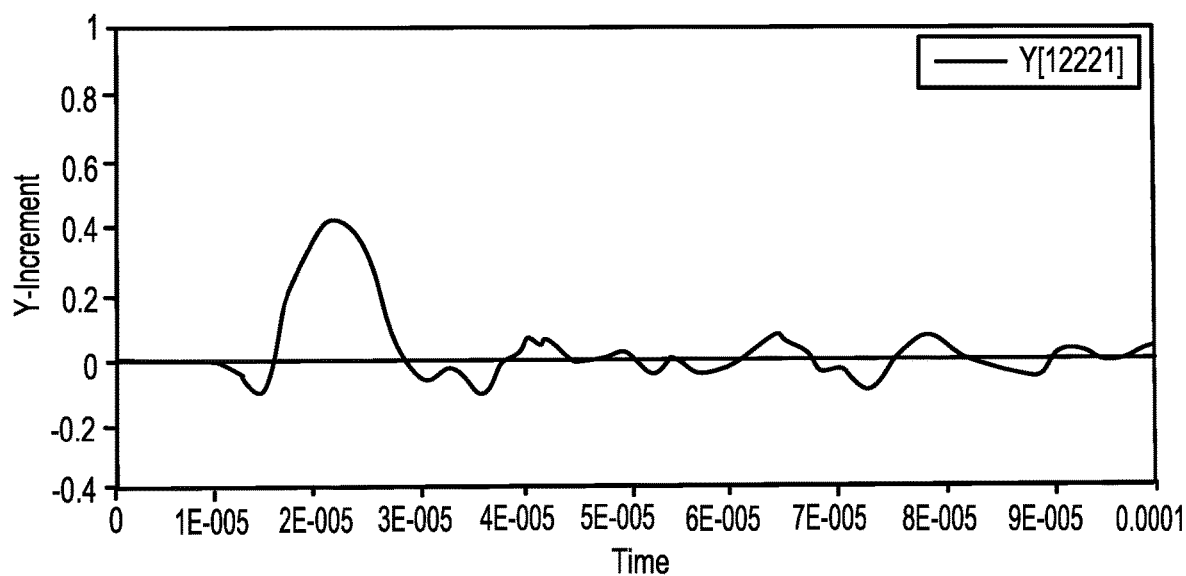

FIGS. 6A and 6B show plots of diameter versus time for a substantially spherical PPR material with a Poisson's ratio of 0.45 and an NPR material with a Poisson's ratio of –0.45, respectively, responsive to being struck with an equivalent force. In this example, the NPR material undergoes a smaller initial change in diameter than does the PPR material, and the oscillations in diameter are smaller in magnitude and dampen more quickly. Again, although FIGS. 6A and 6B are specific to substantially spherical materials, a similar behavior occurs in NPR and PPR materials of other shapes. The material of an item of cookware can be selected to balance rigidity and elasticity.

Figure 7:
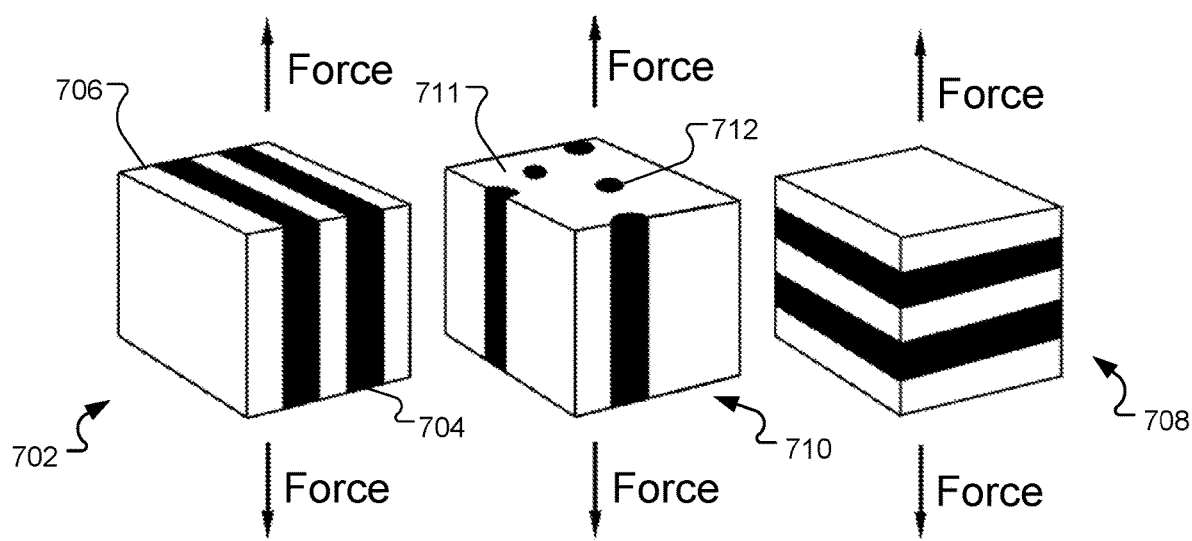
FIG. 7 is an illustration of composite materials.

FIG. 7 illustrates examples of NPR-PPR composite materials. An NPR-PPR composite material 702 is a laminar composite including alternating layers 704 of NPR material and layers 706 of PPR material. The layers 704, 708 are arranged in parallel to a force to be exerted on the composite material 702. Although the layers 704, 706 are shown as having equal width, in some examples, a laminar composite can have layers of different widths.

An NPR-PPR composite material 708 is a laminar composite including alternating layers of NPR material and PPR material, with the layers arranged perpendicular to a force to be exerted on the material 708. In some examples, the layers of a laminar composite are arranged at an angle to the expected force that is neither perpendicular nor parallel.

An NPR-PPR composite material 712 is a matrix composite including a matrix phase 711 of NPR material with a reinforcement phase 712 of PPR material. In the material 712, the reinforcement phase 712 includes fibers of the PPR material; in some examples, the reinforcement phase 712 can include particles or other configuration. In some examples, NPR-PPR composite materials can have a matrix phase of a PPR material with a reinforcement phase of an NPR material.

Figure 8:
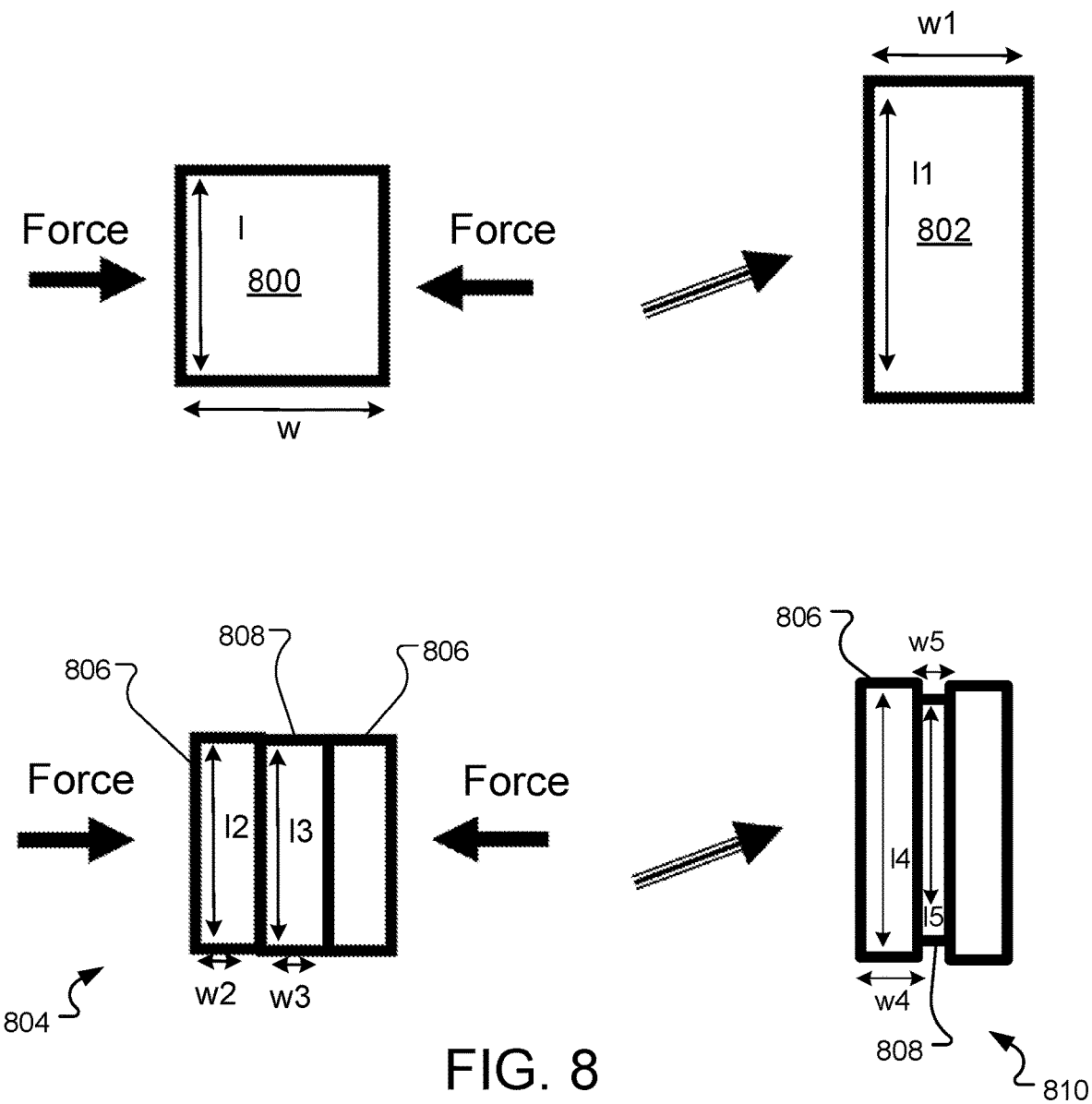
FIG. 8 is an illustration of a material with a positive Poisson's ratio and a composite material.

FIG. 8 illustrates the mechanical behavior of PPR and NPR/PPR composite materials. A hypothetical block 800 of PPR material, when compressed along its width w, deforms into a shape 802. The width w1 of the compressed block 802 is less than the width w of the uncompressed block 800, and the length l1 of the compressed block 802 is greater than the length l of the uncompressed block: the material compresses along the axis to which the compressive force is applied and expands along a perpendicular axis.

A block 804 of NPR/PPR composite material includes a region 808 of NPR material sandwiched between two regions 806 of PPR material. When the block 804 of composite material is compressed along its width, the material deforms into a shape 810. The PPR regions 806 compress along the axis of compression and expand along a perpendicular axis, e.g., as described above for the block 800 of PPR material, such that, e.g., the width w2 of a region 806 of uncompressed PPR material compresses to a smaller width w4 and the length l2 of the region 806 expands to a greater length l4. In contrast, the NPR region 808 compresses along both the axis of compression and along the perpendicular axis, such that, e.g., both the width w3 and length l3 of the uncompressed NPR region 808 are greater than the width w5 and length l5 of the compressed NPR region 808.

Figure 9:
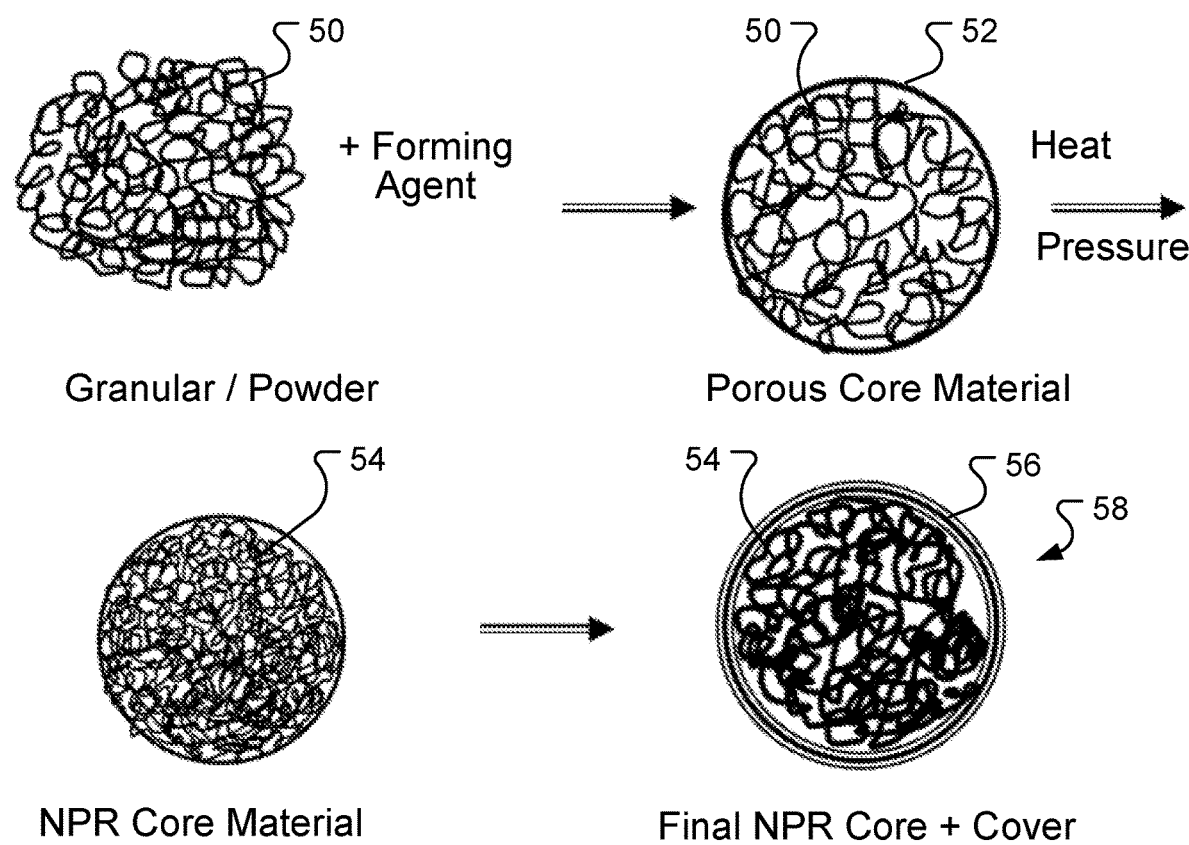
FIG. 9 is an illustration of a method of making a negative Poisson's ratio material.

FIG. 9 illustrates an example method of making an object, such as a portion of an item of cookware, formed of an NPR material. A granular or powdered material, such as a polymer material (e.g., a rubber) is mixed with a foaming agent to form a porous material 50. The porous material 50 is placed into a mold 52. Pressure is applied to compress the material 50 and the compressed material is heated to a temperature above its softening point. The material is then allowed to cool, resulting in an NPR foam 54. The NPR foam 54 is covered with an outer layer 56, such as a polymer layer, and heat and pressure is applied again to cure the final material into an object 58.

In some examples, a material can be formed into an NPR material by forming nanoscale or microscale structures, such as spheres or tubules, with the material.

Other methods can also be used to fabricate an object formed of an NPR material or an NPR-PPR composite material, such as an item of cookware. For example, various additive manufacturing (e.g., 3D printing) techniques, such as stereolithography, selective laser sintering, or other appropriate additive manufacturing technique, can be implemented to fabricate an object formed of an NPR material or an NPR-PPR composite. In some examples, different components of the object are made by different techniques. For example, a portion of an item of cookware (e.g., a handle) may be 3D printed while the base is not, or vice versa. Additive manufacturing techniques can enable seams to be eliminated.

Other embodiments are within the scope of the following claims.

What is claimed is:

1. A cooking vessel comprising:
   a base having a flat bottom;
   a sidewall connected to and surrounding the base, thereby defining an interior space configured for containing food;
   in which the base comprises a layered composite material, in which:
      a first layer of the composite material has a positive Poisson's ratio (PPR); and
      a second layer of the composite material is disposed in contact with the first layer and comprises a material having a negative Poisson's ratio (NPR),
   wherein the second layer of the composite material comprises a matrix composite comprising a matrix of PPR material with inclusions of NPR material.

2. The cooking vessel of claim 1, in which the first layer of the composite material and the second layer of the composite material are disposed parallel to the flat bottom of the base.

3. The cooking vessel of claim 1, in which the composite material comprises a third layer comprising a PPR material, in which the second layer comprising the NPR material is disposed between the first layer and the third layer of the composite material.

4. The cooking vessel of claim 1, in which the second layer of the composite material comprises an NPR foam.

5. The cooking vessel of claim 4, in which the NPR foam has a characteristic dimension of between 0.1 μm and 3 mm.

6. The cooking vessel of claim 1, in which the second layer of the composite material comprises a metal or ceramic having a negative Poisson's ratio.

7. The cooking vessel of claim 1, comprising a handle attached to the sidewall.

8. The cooking vessel of claim 7, comprising a rivet attaching the handle to the sidewall.

9. The cooking vessel of claim 8, in which the rivet comprises an NPR material.

10. The cooking vessel of claim 7, in which the handle comprises an NPR material.

11. The cooking vessel of claim 7, in which the handle and the sidewall are formed from a single piece of the composite material.

12. The cooking vessel of claim 1, in which the base and the sidewall are formed from a single piece of the composite material.

13. The cooking vessel of claim 1, wherein the composite material comprises a ferromagnetic material.

14. The cooking vessel of claim 13, in which the first layer of the composite material comprises the ferromagnetic material.

15. The cooking vessel of claim 1, wherein the composite material comprises a thermally conductive material.

16. The cooking vessel of claim 1, in which the first layer of the composite has a coefficient of thermal conductivity that is greater than a coefficient of thermal conductivity of the second layer of the composite.

17. The cooking vessel of claim 1, in which the cooking vessel exhibits a zero Poisson's ratio.

18. A cooking vessel comprising:
a base having a flat bottom;
a sidewall connected to and surrounding the base, thereby defining an interior space configured for containing food;
in which the base comprises a layered composite material, in which:
a first layer of the composite material has a positive Poisson's ratio (PPR); and
a second layer of the composite material is disposed in contact with the first layer and comprises a material having a negative Poisson's ratio (NPR),
wherein the second layer of the composite material comprises an NPR foam having a re-entrant foam structure.

* * * * *